UNITED STATES PATENT OFFICE.

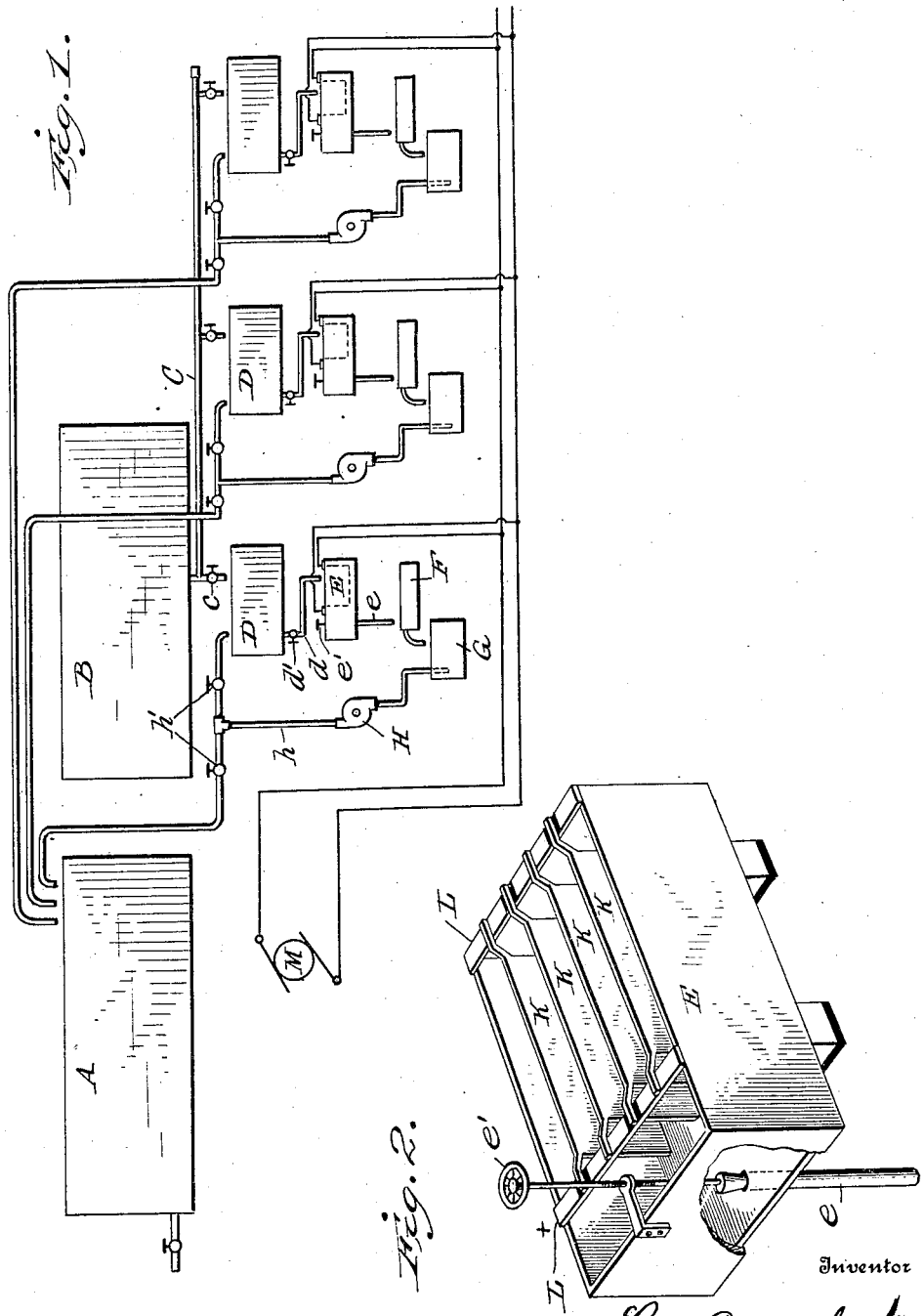

LUIS AMENÁBAR, OF COQUIMBO, CHILE.

PROCESS OF RECOVERING COPPER FROM COPPER-BEARING SOLUTIONS.

No. 890,887.  Specification of Letters Patent.  Patented June 16, 1908.

Application filed November 4, 1907. Serial No. 400,518.

*To all whom it may concern:*

Be it known that I, LUIS AMENÁBAR, of Coquimbo, in the Province of Coquimbo, Chile, have invented a certain new and useful Improvement in Processes of Recovering Copper from Copper-Bearing Solutions; and I do hereby declare the following to be a full, clear, and exact description of the same, reference being had to the accompanying drawings, forming a part of this specification, and to the figures and letters of reference marked thereon.

This invention has for its object to provide an improved process of recovering copper from the lixivium or liquor derived from a leaching, lixiviating or similar process, in which the copper content of the ore is taken into solution.

In accordance with present prevailing commercial practice, it is customary to run the solution derived from the lixiviation plant into suitable tanks, usually of large aggregate capacity and to precipitate the copper by means of iron in a metallic state and usually in the form of scrap iron. The operation of precipitation requires from two to three days time and results in a large waste of the iron, to say nothing of the large tanks and space required in a plant having any considerable capacity.

In accordance with the present invention the liquor containing the copper in solution especially a sulfuric solution is treated electrolytically in relatively small volumes or units in a circulating system or systems, the electrolytic action being so regulated that the copper is precipitated in a non-coherent, granular or flocculent form without destroying or requiring that the electrodes between which the electric current is caused to flow shall be changed or renewed and the result being that the precipitate is carried along with the solution and separated therefrom at a succeeding point in the system.

Generally speaking, an apparatus for carrying the present process into practice preferably embodies two storage reservoirs of relatively large capacity, one for the liquor from the lixiviation plant and the other for the liquor which has already been treated and the copper recovered therefrom. Under any circumstances the apparatus embodies one or any desired number of circulating systems, each comprising an electrolytic tank, a separating means for the copper precipitated by the electrolytic action, suitable piping and means whereby the liquor may be circulated through the electrolytic tank and separating means or, when sufficiently treated discharged into one of the storage tanks from which it may be conveyed to the lixiviation plant.

In the accompanying drawings—Figure 1 is a diagrammatic illustration of an apparatus with which the present invention may be carried into practice, a series of three circulating systems being illustrated. Fig. 2 is a perspective view of an electrolytic tank such as is preferably employed in carrying the invention into practice.

In said drawings, the letters A and B indicate the storage tanks; tank B being adapted to receive the liquor from the lixiviation plant and the tank A to receive the liquor from which the copper has been recovered and which may be returned to the lixiviation plant. From the tank B the copper charged liquor is conveniently drawn through a pipe C and stop cocks c to one of the tanks D, preferably of relatively small capacity and forming part of the circulating system to be now described. From tank D the liquor passes through a pipe d ha ing a regulating cock d' therein, to one end of an electrolytic tank or tanks E, a discharge e controlled by a valve e' being provided at the opposite end of the electrolytic tank for permitting the liquor and precipitated copper to pass into a settling or separating tank F. The overflow from separator F passes into a container G from which it may be pumped or conveyed back to the tank D to complete the circulating system or, if sufficiently treated, it may be directed into the tank A. As illustrated, a pump H is provided in each circulating system with suitable piping indicated at h for conveying the liquor from the container G to tanks D or A, as desired, the branch pipes leading to said tanks being controlled by valves h.

Each of the electrolytic tanks is preferably provided with a plurality of anode and cathode plates K, best seen in Fig. 2. Said anode and cathode plates are arranged to alternate and in the preferred construction are supported on the conductor bars L by which current is conveyed to them, it being understood, of course, that the electrodes are insulated from the conductor bars alternately at opposite ends of the tank, whereby the current is caused to traverse the liquor contained in the tank between the electrodes. The electrodes are preferably arranged in multiple in each tank and where a series of circulating systems are employed it is preferred, but not considered to be essential, that the tanks should be arranged in multiple with each other in the supply circuit. The multiple arrangement is illustrated in Fig. 1 of the accompanying drawings, where M indicates a generator and N' circuit wires.

In operation, the desired quantity of copper charged liquor is run into the tank D and from the latter it is allowed to flow under valve regulation to the electrolytic tank E where precipitation takes place, and from the latter the liquor and precipitate together pass on to the settling tank F, where the precipitate is deposited and may be removed by approved means, such, for instance, as a foraminous shovel. The liquor partially or wholly free from copper, passes on to the container G and from the latter back to the tank D. The circulation of the solution in the system is continued until the whole quantity forming any one charge has been sufficiently treated after which it is conveyed away or diverted to the storage tank A for subsequent use.

Demonstration on a large scale in practical work, has shown that practically complete precipitation of the copper in a given charge may be effected in one hour's time, but in order to prevent the copper from cohering or adhering to the cathode as it does in ordinary refining operations, the current employed must be of a sufficiently high density to precipitate the copper in a spongy, granular flocculent or non-coherent form. Although the density of current employed may be varied between wide limits, practice has demonstrated that with a current of 200 amperes and approximately 5 volts per square foot of electrode, gives excellent results, both as to economy in time and current consumption. Practice further demonstrates that an amperage below 25 or 30 amperes per square foot of electrode surface will not give satisfactory results.

Under the required conditions any deposit on the cathode will be of such nature that it may be readily dislodged by shaking the electrodes, washing them, circulating the electrolyte or by a light scraper applied manually or otherwise and when dislodged such precipitate will pass out of the electrolytic tank with the liquor. In practice the circulating system serves to carry all of the precipitate to the separator and to further this particular end, it is preferred that the liquor should be supplied to the electrolytic tank at one end, and discharged therefrom at the opposite end, the flowing liquor thereby serving as the means for conveying or carrying off the precipitate and thereby avoiding the necessity of employing other means save possibly the occasional attention of an attendant to apply a light cleaner to the sides of the cathodes.

It is important in order to give the best results and to provide a permanent organization in so far as the anodes and cathodes are concerned that the anodes employed be of an insoluble material, such as lead or carbon, though any insoluble conducting material is suitable. The cathodes may be of copper, lead or other metal. The use of insoluble anodes is advantageous in that they do not require constant replacement and, further, by their use, the solution containing considerable sulfuric acid is not vitiated but is preserved for subsequent use in the lixiviation of new ores. The electrolytic tanks should be supported on insulators to prevent current leakage and the tanks D and G it is obvious should be of such capacity that any differences between the rapidity of circulation in the two sides of the system will not cause an overflow.

Having thus described my invention, what I claim as new, and desire to secure by Letters Patent, is:

1. The process of recovering copper from a copper bearing solution which consists in subjecting the solution to the electrolytic action of a current of great density while in a circulating system in which the solution is brought into and removed from the field of electrolytic action a number of times.

2. The process of recovering copper from a copper bearing solution which consists in repeatedly circulating the solution through an electrolytic tank and separator and subjecting the solution to the electrolytic action of currents of great density whereby a non-coherent precipitate of copper is formed and carried to the separator by the circulating solution.

3. The process of recovering copper from a copper bearing solution which consists in supplying the solution to one end of an electrolytic tank, discharging the same from the bottom at the opposite end and subjecting the solution to the electrolytic action of currents of great density whereby the copper is precipitated in non-coherent form and is carried from the tank with the solution.

4. The continuous process of recovering copper from a copper bearing solution which consists in subjecting the same to the electrolytic action of currents of great density between an insoluble anode and metal cathode, discharging the non-coherent precipitate from the electrolytic field as formed and finally separating the solution and precipitated copper.

5. The continuous process of recovering copper from copper bearing solution which consists in subjecting the same to the electrolytic action of currents of great density between an anode which is insoluble and a cathode whereby a non-coherent precipitate is formed and in discharging the solution and precipitate together from the electrolytic field.

6. The process of recovering copper from a copper bearing solution which consists in circulating the solution more than once through a circulating system containing in succession a field of electrolytic action, and a separator for the precipitate, subjecting the solution in said field to the action of currents of great density to form a mechanically subdivided precipitate and finally discharging the liquor from the circulating system and removing the separated precipitate.

LUIS AMENÁBAR.

Witnesses:
ELIZABETH GRIFFITH,
THOMAS DURANT.